United States Patent [19]
Matsuura et al.

[11] Patent Number: 5,954,966
[45] Date of Patent: Sep. 21, 1999

[54] MEMBRANE COMPOSITION AND METHOD OF PREPARATION

[75] Inventors: Takeshi Matsuura, Ottawa; Paul Santerre, Toronto; Roberto Martin Narbaitz, Ottawa; Vu Anh Pham, Ottawa; Yi Fang, Ottawa; Hassam Mahmud, Ottawa; Fakhir Baig, Mississauga, all of Canada

[73] Assignees: University of Ottawa, Ottawa; Fielding Chemicals Limited, Mississauga, both of Canada

[21] Appl. No.: 08/791,327

[22] Filed: Jan. 31, 1997

[51] Int. Cl.$^6$ .................................................. B01D 15/00
[52] U.S. Cl. ............... 210/640; 210/500.41; 210/500.42; 95/43; 95/5; 96/4; 264/48; 264/49
[58] Field of Search .................... 210/500.41, 500.36, 210/500.42, 640; 95/43–50; 96/4; 264/48, 49

[56] References Cited

U.S. PATENT DOCUMENTS

| | | | |
|---|---|---|---|
| 4,929,358 | 5/1990 | Koenitzer | 210/640 |
| 5,095,171 | 3/1992 | Feimer et al. | 210/640 |
| 5,232,600 | 8/1993 | Degen et al. | 210/640 |
| 5,286,279 | 2/1994 | Wu | 95/45 |
| 5,756,632 | 5/1998 | Ward et al. | 210/500.23 |

FOREIGN PATENT DOCUMENTS

| | | |
|---|---|---|
| 2015413 | 4/1990 | Canada . |
| 2046332 | 12/1990 | Canada . |
| 2051497 | 9/1991 | Canada . |
| 2115648 | 10/1992 | Canada . |
| 2138056 | 12/1994 | Canada . |
| WO 90/11820 | 10/1990 | WIPO . |

OTHER PUBLICATIONS

Bakish Materials Corporation, "Proceedings of Seventh International Conference on Pervaporation Processes in the Chemical Industry", Reno, Nevada, Feb. 26–Mar. 1, 1995.

Mahmud, Hassan, "Development of Pervaporation Membrane for Volatile Organic Chemical Removal", Thesis, Master of Applied Science in Environmental Engineering, Department of Civil Engineering, University of Ottawa, Feb., 1996.

Vu Anh, Pham, "Surface Modifying Macromolecules for Enhancement of Polyethersulfone Pervaporation Membrane Performance", Thesis, Master of Applied Science, Department of Chemical Engineering, University of Ottawa, Aug. 1995.

*Primary Examiner*—Ana Fortuna
*Attorney, Agent, or Firm*—Andrew Hicks; Scott & Aylen

[57] ABSTRACT

The present invention relates to membranes useful in the separation of water from a solution containing volatile organic compounds and water. The membranes may be used in dehydrating an organic/water mixture to purify an organic when an organic is of interest or, alternatively, producing pure water from an organic/water mixture when clean water is of interest. The membranes include a hydrophilic base polymer, an optional pore-forming polymer and a surface modifying macromolecule (SMM) which imparts surface hydrophobicity to the membrane.

17 Claims, 1 Drawing Sheet

MEMBRANE COMPOSITION AND METHOD OF PREPARATION

FIELD OF THE INVENTION

The present invention relates to membranes useful in the separation of water from a solution containing volatile organic compounds and water. The membranes may be used in dehydrating an organic/water mixture to purify an organic when an organic is of interest or, alternatively, producing pure water from an organic/water mixture when clean water is of interest. The membranes include a hydrophilic base polymer, an optional pore-forming polymer and a surface modifying macromolecule (SMM) which imparts surface hydrophobicity to the membrane.

BACKGROUND OF THE INVENTION

Millions of tons of volatile organic compounds (VOCs) enter and pollute the environment each year. In particular, this pollution occurs as a result of improper disposal or treatment of industrial wastewater often resulting in contaminated groundwater. Although contaminated groundwater frequently only contain parts per billion levels of VOCs, this level of contamination is sufficient to render water unfit for human consumption. Cleanup of contaminated groundwaters is difficult, expensive and time-consuming.

Conventional treatment methods for removal and recovery of VOCs include air stripping, adsorption, advanced oxidation and distillation, are often effective only at specific VOC concentration levels and may result in farther environmental contamination such as the release of gaseous VOC emissions.

Pervaporation is a membrane based separation process which overcomes many of the deficiencies of various technologies for the recovery/removal of organic compounds from industrial waste streams or contaminated water in the environment. In pervaporation involving organic and aqueous components, the organic compounds in a liquid stream may be driven across a permselective membrane emerging as a vapour on the downstream side of the membrane which may be subsequently condensed and collected. A vacuum pressure maintains the separation driving force. Permeation of organic compounds is governed by the properties of the membrane. Normally, membranes having dominant hydrophobic properties permit the permeation of organic compounds while preventing the permeation of water. Similarly, ultrafiltration is another membrane based separation process which overcomes deficiencies in the recovery/removal of organic compounds from industrial waste streams. In ultrafiltration, separation occurs through the membrane wherein the upstream and downstream components are both in the liquid phase.

In the alternative, a membrane having dominant hydrophilic properties will permit the permeation of water through the membrane thereby effecting a separation of aqueous and VOC components. Generally, membrane characteristics will dictate whether a membrane is suitable for the extraction of VOCs from aqueous solutions or for the extraction of water.

For example, membranes made from hydrophobic elastomeric polymers have been known to be highly organophilic and effective in VOC removal from water by pervaporation. To date, the most practical pervaporation applications have been reported with polydimethylsiloxane (PDMS), ethylene/propylene rubber (EPR) or polyether-block-amid (PEBA) membranes. PDMS composite membranes for the removal and recovery of trace organics from water are commercially available. PDMS membranes, however, require chemical treatment to control swelling which results in the reduction of both permeation rate and selectivity due to the absorption of feed components.

Membrane efficacy requires large contact surface areas. PDMS composite membranes, however, due to weak mechanical properties require specially designed modules in order to provide a high surface to volume ratio and, hence, are limited with respect to their industrial applicability.

In the particular application of pervaporation, many hydrophobic membranes used for pervaporation are limited with respect to their mechanical stability, as indicated above, or with respect to their selectivity to be useful in particular separations. Furthermore, many hydrophobic membranes are of limited use because of a tendency to foul thus resulting in unacceptable permeation rates.

Accordingly, there has been a need for a class of membranes which overcome the deficiencies as described above and specifically, there has been a need for a class of membranes which preferentially separate water from an aqueous/VOC mixture.

Specifically, there has been a need for a class of membranes in which the bulk hydrophilic properties of the membrane are not completely dominated by the hydrophobic surface properties of the membrane so as to remain hydrophilic, that is to allow the permeation of water, while remaining hydrophobic at the surface, to prevent swelling of the hydrophilic membrane underneath. Furthermore, there has been a need for a class of membranes with the above properties which further minimize membrane fouling.

A review of the prior art shows that hereto before, the design of membranes for pervaporation having high surface hydrophobicity which enable the permeation of water has not been achieved.

For example, Fang et al (Effect of Surface Modifying Macromolecules and Solvent Evaporation time on the Performance of Polyethersulfone Membranes for the Separation of Chloroform/Water Mixtures by Pervaporation, *Journal of Applied Polymer Science*, vol 54, 1937–1943, 1994) describes the preparation and testing of SMM modified membranes in the separation of chloroform/water mixtures wherein organics preferentially permeate through the membrane.

Pham et al. (Design and Development of a Polymeric Additive to Enhance the Performance of Polyethersulfone Membranes for the Removal of Organic Compounds from Aqueous Solutions by Pervaporation, *Chemical Engineering Society Abstract*, October 1994) describes removal of volatile organic compounds from aqueous solutions. Fang et. al. (Application of Surface Modifying Macromolecules for the Preparation of Membranes with High Surface Hydrophobicity to Extract Organic Molecules from Water by Pervaporation, *Proceedings of Seventh International Conference on Pervaporation Processes in the Chemical Industry*, Reno, Nev., February 1995) describes the preparation of SMM modified membranes in which organics permeate through the membrane.

Anh, Pham (Surface Modifying Macromolecules for Enhancement of Polyethersulfone Pervaporation Membrane Performance, University of Ottawa, Department of Chemnical Engineering, August 1995) describes the preparation of membranes containing SMM useful in the separation of water/organics wherein organics are removed from a solution containing volatile organic compounds.

PCT publication WO 90/11820 describes a porous article having a hydrophobic polymer body with integrated hydrophilic polymer co-precipitated with the hydrophobic polymer. Canadian Patent Application 2,051,497 describes a membrane process in which isopropanol is recovered by pervaporation across a membrane of polyethylene imine. Canadian Patent Application 2,015,413 describes a process for preparing a microporous membrane having both hydrophilic and hydrophobic polymers. Canadian Patent Application 2,138,056 describes a hydrophilic polytetrafluoroethylene membrane used in the pharmaceutical and medical industries. Canadian Patent Application 2,046,332 describes a composite membrane for separating water from fluids containing organic compounds by pervaporation, the composite membrane having cross-linked polyvinyl alcohol. Canadian Patent Application 2,115,648 describes an osmotic drug-delivery device having hydrophobic wall materials.

SUMMARY OF THE INVENTION

In accordance with the invention, a membrane for the separation of water and volatile organics is provided, the membrane comprising:

a surface modifying macromolecule (SMM) of the general formula:

wherein A is a hard segment component of the macromolecule and is a substituted or unsubstituted aromatic and/or aliphatic group, P is a polar linking group, $[B]_r$ is a soft segment polymer, C is a terminal polyfluoro oligomeric group, r is in the range of 1–10, q is in the range of 1–3 and the molecular weight of the $[B]_r$ group is in the range of 200–6000;

a hydrophilic base polymer miscible with the SMM; and, a hydrophilic pore forming polymer miscible with the base polymer wherein the membrane is solution cast from a solution containing 0.1–5 wt % of the surface modifying macromolecule (SMM)

10–50 wt % of the hydrophilic base polymer

0–8 wt % of the hydrophilic pore forming polymer miscible with the base polymer; and, 37–89.9 wt % of a solvent, said solvent subsequently eliminated from the membrane by either an evaporation or a solvent exchange process or a combination of the evaporation and solvent exchange processes.

In various embodiments of the invention, P is preferably a urethane linkage but may also be amide, ester or urea. Preferably, $\{P\text{-}A\text{-}P\text{-}[B]_r\}_q$, a segmented block oligomeric copolymer, is formed by the reaction of a substituted or unsubstituted aromatic and/or aliphatic having end isocyanate, hydroxy, amine or carboxylic acid groups with a soft segment polymer having end hydroxy or amine groups to form a urethane, amide, ester or urea linkage. In particular embodiments, the precursor hard segment isocyanates can be selected from any one of the group methylene di-phenyl 4,4' diisocyanate (MDI), 2,4 toluene diisocyanate, 2,6 toluene diisocyanate, 1,4-cyclohexane diisocyanate, methylene 4,4' di-cylcohexane diisocyanate or 1,6 hexane diisocyanate as well as other diisocyanates known to those skilled in the science of polyurethane chemistry. The precursor soft segment polymer can be selected from any one of polypropylene oxide polyols, polytetramethylene oxide, polyalkylene oxide polyol, polycarbonate polyol, polyester polyol or polycaprolactone polyol.

End capping the segmented block oligormeric copolymer above is achieved by reaction with a polyfluro oligomeric group selected from polyfluroalcohols or polyfluroamines and preferably selected from any one of a group having the general formula $CF_3(CF_2)_pCH_2CH_2O$—where p is 4–12 or $CF_3(CF_2)_m(CH_2CH_2O)_n$—where n is 1–10 and m is 1–20.

In still further embodiments, the base polymer is selected from any one of or a combination of polyethersulfones, polyureas, polyetherimides, polyesters, polyurethanes or polycarbonates, and the pore forming polymer is selected from any one of or a combination of polyvinylpyrrolidone (PVP), ethylene glycol, alcohols, polyethylene glycol.

The membrane in accordance with the invention enables the separation of water from volatile organics by pervaporation and provides a permeation rate of seater through the membrane of 0.01–10 kg/m² hr.

Still further, the membrane in accordance with the invention is characterized by an advancing contact angle greater than 90 degrees and a receding contact angle greater that 21 degrees as well as a fluorine/carbon ratio at the membrane surface to a depth of 10 nm is greater than or equal to 0.2.

The membrane may also comprise a backing material.

Still further, the invention provides a method of separating water from a solution containing water and at least one volatile organic compound with a membrane by feeding the water/volatile organic solution into a pervaporation cell having a membrane as defined above and collecting a downstream water permeate wherein the water/volatile organic solution includes any one of or a combination of mono or multi-functional alcohols such as methanol, ethanol, butanol, isopropyl alcohol, ethylene glycol, butyl cellosolves, iso propyl cellosolves or glycol, carboxylic acids such as glutaric acid, succinic acid or adipic acid, organic acids such as nitric acid, ketones such as acetone, methyl ethyl ketone (MEK), or methylisobutyl ketone (MIBK), esters such as ethyl acetate or n-butyl acetate, aromatics such as xylene or toluene, aliphatic hydrocarbons, halogenated hydrocarbons such as niethylene chloride, fatty acids and salts.

BRIEF DESCRIPTION OF THE DRAWINGS

These and other features of the invention will be more apparent from the following description in which reference is made to the appended drawings wherein.

DETAILED DESCRIPTION OF THE INVENTION

Figure 1:
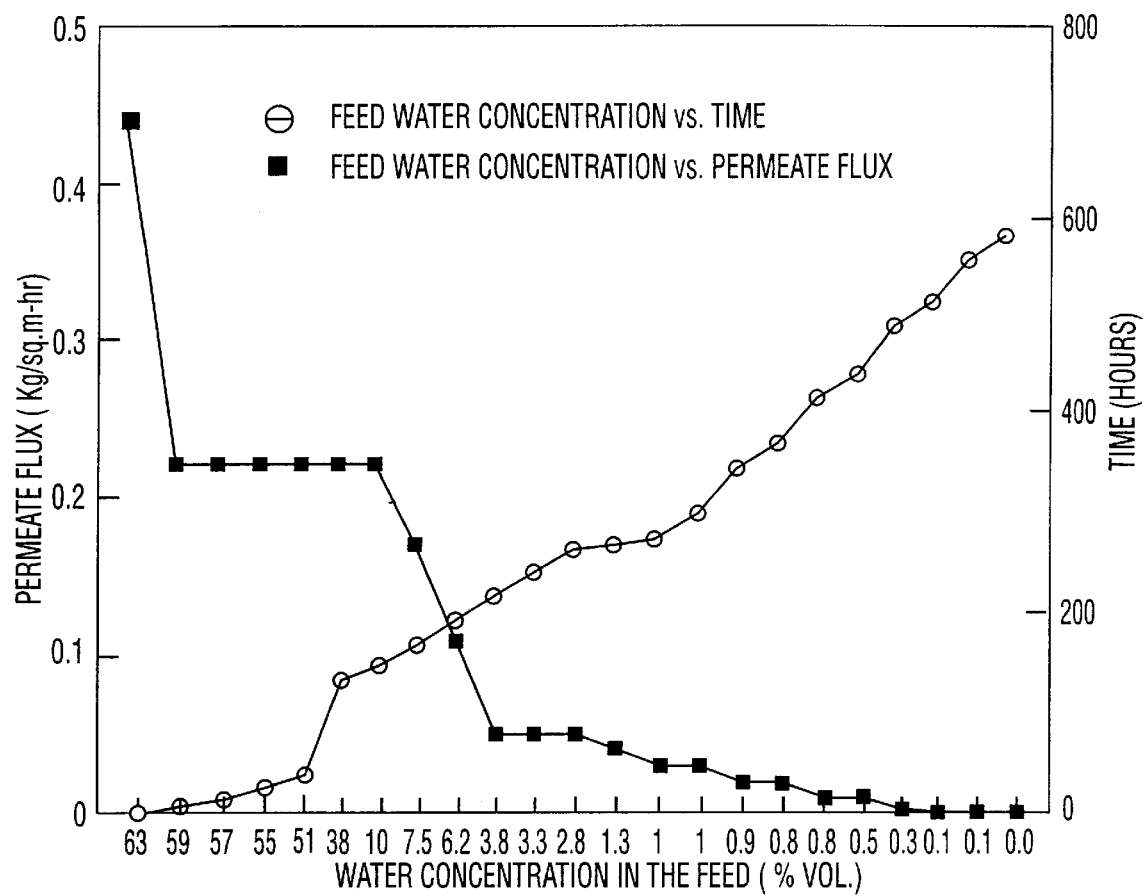
FIG. 1 is a graph showing the results of pervaporation experiments with isopropyl alcohol.

The specific design of a membrane for use in a particular separation is governed by many factors including relative hydrophilic/hydrophobic properties, selectivity, pore size, mechanical strength and tendency to foul. Through the modification of the chemical composition of the membrane and/or the method of preparing the membrane, specific and quantifiable surface and bulk properties can be engineered into the membrane enabling the separation or removal of specific components or contaminants in a solution. Specifically, polyethersulfone (PES), polyetherimide (PEI) and polysulfone (PS) are membrane forming compounds which may be used as a base membrane component and whose relative hydrophobic or hydrophilic properties can be tailored through the incorporation of additives within the membranes and, in particular, through the use of surface modifying macromolecules (SMM) to enable effective separations. Still further, pore forming polymers, such as polyvinylpyrolidone (PVP) can be incorporated to enhance the formation of pores within the membrane.

In accordance with the invention, fluorohydrocarbons, called zonyl intermediates (DuPont) and surfactants were used for the synthesis of specific poly-fluoroetherurethanes designated herein as surface modifying macromolecules. SMM's. The zonyl intermediates were selected on the basis of the ability of these compounds to induce critical surface tensions at an interface. Specifically, zonyl intermediates can induce critical surface tensions of 3–5 dynes/cm in comparison to 18.5 dynes/cm for PTFE (polytetrafluoroethylene) and 21–24 dynes/cm for PDMS (polydimethylsiloxane) (DuPont).

The effectiveness of SMMs in altering the surface properties of a membrane are a result of their migration toward a polymer/air interface during membrane preparation, this migration a result of the amphipathic properties of the SMM molecule. Essentially, the structure of the SMM molecule is such that the polymeric backbone of the SMM molecule remains buried in the membrane while the fluorinated tail aligns itself with the interface thereby imparting hydrophobic properties to the membrane surface.

Surface Modifying Macromolecule Synthesis

The synthesis of SMM's involves reacting a hard segment precursor having at least one polar end group, such as an isocyanate group, with a soft segment precursor polymer such as an oligomeric diol to yield a segment block oligomeric copolymer. The segment block oligomeric copolymer is then reacted with a mono- or di-functional polyfluoroalcohol or polyfluoroamine to produce the SMM.

More specifically, SMMs were synthesized in accordance with the following method: Methylene bis-phenyl diisocyanate (MDI) was reacted with polypropylene diol (PPO) of average molecular weight 425 to form a prepolymer, The prepolymer was then reacted with the fluorotelomer, zonyl BA-L™. The fluorotelomers were received as a mixture of fluorotelomers (structure: $CF_3$—$(CF_2)_m$—$(CH_2)_2$—OH) with a variable number, m, of $CF_2$ repeating units, ranging from 4–12. SMM may be synthesized using a multi-functional isocyanate, a multi-functional soft segment precursor reactive therewith, and a mono function polyfluoroalcohol or polyfluoroamine.

The isocyanate is preferably, but not limited to be, di-functional in nature in order to favor the formation of a linear SMM. A linear SMM (as opposed to branched or crosslinked SMM's) is preferred because a linear SMM will have better migration properties within a polymer substrate. A preferred diisocyanate for membrane applications is methylene di-phenyl diisocyanate (MDI). The soft segment precursor molecule is preferably, but not limited to be, di-functional in order to favour the formation of a linear SMM. Again, linearity favors migration properties within the base polymer substrate. Examples of typical soft segment precursors include polypropylene oxide polyols of molecular weight 425, and polytetramethylene oxide of molecular weight 600. SMM's are synthesized using a preliminary prepolymer method similar to the classical one used for polyurethanes. However, subsequent steps differ in that chain extension is not carried out. A monofunctional oligomeric fluorinated molecule with an active hydrogen, for example a mono-fluorinated alcohol, is used to cap the prepolymer, rather than chain extend the prepolymer. The fluorinated alcohol preferably has a single fluoro-tail but is not limited to this feature. A general formula for an oligomeric fluoro-alcohol of use in the synthesis of SMMs is H—$(OCH_2CH_2)_n$—$(CF_2)_m$—$CF_3$ wherein n can range from 1 to 10, but preferably ranges from 1 to 4, and m can range from 1 to 20 but preferably ranges from 2 to 12. Examples of specific SMMs are described below in examples of the invention. Distillation at 0.025 mmHg yielded three major fractions. A $2^3$ factorial design was used to study the effects of reactant stoichiometry, prepolymer reactant concentration and chain length of polyfluoro alcohol on SMM properties. The general structure of SMM's are

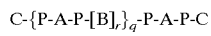

wherein A is a hard segment component of the macromolecule and is a substituted or unsubstituted aromatic and/or aliphatic group, P is a polar liking group, $[B]_r$ is a soft segment polymer, C is a terminal polyfluoro oligomeric group, r is in the range of 1–10, q is in the range of 1–3 and the molecular weight of the $[B]_r$ group is in the range of 200–6000.

The structure of PES (Victrex 4800P, ICI Advanced Materials, Billingham, Cleveland. England) is:

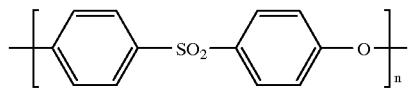

PES was used as a base membrane component Polyvinylpyrrolidine (PVP) (mol wt approx 10,000, Aldrich Chemical Company, Inc., Milwaukee, Wis.) was used as a pore former.

Dimethylacetamide (DMAC) (BDH Inc., Toronto, Ontario) was used as solvent.

Membrane Preparation

Specific membranes prepared in accordance with the invention were solution cast from a membrane preparation solution having the following composition:

25 wt % polyethersulfone (PES) as a base polymer;

0–1 and 1–6 wt % polyvinylpyrrolidone (PVP) as a pore-forming polymer; and,

0–1 and 1–5wt % SMM; and, the remaining wt % a solvent such as dimethylacetamide (DMAc) wherein the solvent is subsequently eliminated from the membrane by either an evaporation or a solvent exchange process or a combination of the evaporation and solvent exchange processes after casting the membrane.

An example of an SMM (referred to as SMM41) which contains an appropriate fluorine content to modify a PES surface is synthesized with PPO diol of molecular weight 425, 4,4'-methylene diphenyl-diisocyanate (MDI), and the low boiling fraction of the fluoroalcohol (BA-L). This enables synthesis of an SMM with a target 2:1:2 stoichiometry of MDI:PPO:BA-L. The conditions of the synthesis for this reaction were as follows. 8.5 grams of PPO were reacted with 10.02 grams of MDI for three hours and then 17.72 grams of BA-L (Low boiling fraction) were added to the reaction. The mixture was reacted without catalyst in 250 mls of dimethylacetamide (DMAc) and the reaction temperature for the prepolymer step was maintained within 40–50° C. The reaction temperature for the end-capping step was 35° C. The polystyrene equivalent weight average molecular weight is $1.1 \times 10^4$ and its total fluorine content is 18% by weight. This SMM has a Tg temperature range of 19° C. to 33° C. This high Tg indicates that it is a relatively rigid SMM and is suited for incorporation into the crystalline or glassy segments of polymers.

The PES and PVP powder were dried at 150° C. and 60° C. respectively in a convection oven for four hours before mixing. The SMM was dissolved in DMAc, then PVP was added and dissolved in the SMM-DMAc solution. PES was added into the solution after PVP was completely dissolved. The solution was filtered to remove undissolved polymer and contaminants and degassed to prevent pinhole formation in the cast membranes.

Membranes were cast on a glass plate to a nominal thickness of 0.0025 cm. Immediately after casting, the films were transferred into a convection oven preheated to 95° C. and were dried for 7 minutes. The cast films were then gelled by immersing the glass plate into ice-cold water. The membranes were kept in the gelation medium overnight and then subjected to a solvent exchange process where the water in the membranes was replaced by ethyl alcohol by successive immersions in ethyl alcohol/water solutions (overnight for each immersion). The solvent exchange process was repeated with solutions of different ethyl alcohol content having 25, 50, 75 and 100 volume % ethyl alcohol respectively. Ethyl alcohol was subsequently vacuum dried at room temperature for approximately 96 hours to yield the final dry membranes.

Pore size of the membranes is less than 1 nm.

Optimization of Base Polymer Concentration:

The base polymer concentration can be varied as is reasonable in order that the resulting membrane 1) enables the incorporation of an SMM into the base polymer and 2) provides the desired water permeation and volatile organic exclusion properties. Practically, the weight % range of base polymer would be in the range of 10–50 wt % of the total membrane preparation solution.

Optimization of PVP Concentration:

As indicated above, a pore forming agent is incorporated into the membrane composition to promote the formation of pores. For PVP optimization, the PVP concentration of the casting solution was varied from 0 to 1.0 to 8.0 wt % while PES and SMM concentrations were maintained at 25 wt % and 1 wt % respectively, the balance being DMAC solvent. The performance of these membranes was evaluated using the pervaporation apparatus with aqueous feed solutions set at concentrations of 10 ppm and 100 ppm $CHCl_3$. The permeation rate was determined and the composition of the permeate analysed in terms of total carbon using a total carbon analyser.

Results indicate that PVP concentration does not substantially affect the permeation rate.

Determination of the Effect of Solution Mixing Period, Solution Age and Membrane Age:

Solution mixing period is the homogenization period between combining the compounds together and filtration. Solution age is the period of time the filtered solution is stored before casting and membrane age is the time between end of drying by solvent exchange and its use in pervaporation. Three solutions were prepared with mixing times of 73, 140 and 306 hours respectively with PVP, PES, SMM and DMAc concentrations of 1.5 wt %, 25.0 wt %, 1.0 wt %, and 72.5 wt %. These solutions were degassed for 96 hours and cooled for 48 hours at 0 degrees prior to their use for membrane casting.

The performance of these membranes was evaluated using a pervaporation apparatus with aqueous feed solutions having concentrations of 10 ppm, 11 ppm and 100 ppm $CHCl_3$. The permeation rate was determined and the composition of the permeate analysed in terms of total carbon using a total carbon analyser.

There was no positive correlation between solution mixing period, solution age, membrane age and flux.

Membrane Characterization Experiments

Table 1 shows the contact angle of water on PES/SMM membranes containing different amount of SMM added. Advancing and receding contact angles provide an indication of the relative hydrophobicity or hydrophilicity (bulk) of a surface and the difference between the advancing and receding contact angles provides an indication of the relative uniformity of the surface with a higher difference indicating a relatively higher degree of non-uniformity. Advancing contact angles in excess of 90° indicate hydrophobicity as do receding contact angles in excess of 21°.

TABLE 1

Impact of SMM content on Advancing and Receding Contact Angle of SMM/PES Membranes

| SMM (wt %) | Advancing Contact Angle (°) | Receding Contact Angle(°) |
| --- | --- | --- |
| 0 | 68.0 | 21.0 |
| 0.5 | 105.5 | 51.2 |
| 1 | 106.2 | 51.7 |
| 2 | 113.4 | 61.3 |

Table 1 indicates that the addition of small amounts of SMM into the membrane casting solution dramatically affects the hydrophobicity of the surface of the membrane as an increase in SMM wt % produces an increase in the advancing and receding contact angles. Thus, the surface shows hydrophobic properties as indicated by the advancing and receding contact angles as well as indicating that a relatively non-uniform surface exists at the microscopic level as indicated by the difference between the advancing and receding contact angles. The results also show that the surface becomes more uniform with higher amounts of SMM.

Table 2 shows the fluorine content at the surface of a PES/SMM membrane as a F/C ratio as detemined by x-ray photoelectron spectroscopy (XPS). For the purpose of this patent application, a take-off angle is defined as the angle that the energy beam makes with the substrate that is being analysed. At a low angle (i.e. 15°) the beam glances the surface and analyses only approximately the top 2 nm of the surfaces. At a high angle (i.e. 90°) the beam is perpendicular to the surface and analyses a depth of approximately 10 nm. Hence an analysis at a 15° angle is more representative of the upper surface while an analysis at a 90° angle is representative of a deeper portion of the surface.

TABLE 2

Atomic Fluorine/Carbon Ratio for various SMM wt %

| Take-Off Angle | F/C Ratio for SMM wt % | | | | | | |
|---|---|---|---|---|---|---|---|
| (°) | 0.5 wt % | 1 wt % | 1.5 wt % | 2 wt % | 2.5 wt % | 3 wt % | 3.5 wt % |
| 90 | 0.035 | 0.034 | 0.25 | 0.24 | 0.39 | 0.37 | 0.44 |
| 45 | 0.047 | 0.039 | 0.29 | 0.28 | 0.43 | 0.43 | 0.52 |
| 15 | 0.035 | 0.008 | 0.58 | 0.39 | 0.66 | 0.73 | 0.73 |

Thus Table 2 indicates that the fluorine content of the membrane increases with decreasing take-off angle indicating that a higher concentration of fluorine is present at the surface of the membrane. this indicates that the SMM has migrated to the surface of the membrane. At an SMM wt % of 0.5 or 1.0, the results indicate that the membrane surface is not saturated with SMM at these concentrations.

Pervaporation Results:

The membrane may be used in dehydrating an organic/water mixture to purify an organic when an organic is of interest or, alternatively, producing pure water from an organic/water mixture when clean water is of interest. Membranes prepared as described above are useful in the dehydration of a number of solutions containing compounds including but not limited to any one of or a combination of mono or multi-functional alcohols such as methanol, ethanol, butanol, isopropyl alcohol, ethylene glycol, butyl cellosolves, iso propyl cellosolves or glycol, carboxylic acids such as glutaric acid, succinic acid or adipic acid, organic acids such as nitric acid, ketones such as acetone, methyl ethyl ketone (MEK), or Tnethylisobutyl ketone (MIBK), esters such as ethyl acetate or n-butyl acetate, aromatics such as xylene or toluene, aliphatic hydrocarbons, halogenated hydrocarbons such as methylene chloride, fatty acids and salts Specific separation properties can be engineered into the membranes to enhance the separation of water from a water/organic solution wherein the bulk hydrophilic or hydrophobic properties and membrane morphology are controlled to provide desired characteristics to the membrane.

Pervaporation Experiments

The membranes were subjected to pervaporation experiments in a static reverse osmosis cell. The effective area of the membrane was 9.6 cm². Approximately 250 g of feed liquid was loaded in the cell and a vacuum was applied at the downstream side of the membrane. The permeate sample was condensed and collected in a cold trap cooled with liquid nitrogen with the first two hours of permeate discarded. The amount of sample removed by membrane permeation was kept below 2% of the initial feed volume in order to ensure that the composition of the feed liquid does not change significantly during a separation run.

The permeation rate was determined by measuring the weight of the sample collected during a pre-determined period. The composition of the sample was determined using a gas chromatograph equipped with a flame ionization detector and connected to a purge and trap concentrator. All pervaporation experiments were carried out at room temperature. The downstream pressure was maintained at 3±1 mmHg unless otherwise stated.

Initially, the membranes were subjected to a pervaporation experiment to investigate the permeability of the membrane to non-polar compounds. Table 3 shows pervaporation results for a chloroform/water mixture with membranes having varying SMM wt %'s.

TABLE 3

Water permeation rates at varying SMM wt % having an upstream chloroform concentration of 1000 ppm

| SMM (wt %) | $CHCl_3$, ppm in permeate | permeation rate, g/h |
|---|---|---|
| 0.0 | 58 | 0.046 |
| 0.5 | 0.0 | 0.025 |
| 1.0 | 2 | 0.021 |
| 1.5 | 0.0 | 0.023 |
| 2.0 | 0.0 | 0.024 |
| 2.5 | 2 | 0.046 |

These results indicate that the permeate is essentially water and that the membrane is impervious to chloroform.

EXAMPLE 1

A specific membrane prepared in accordance with the invention had the following composition:

25 wt % polyethersulfone (PES)
6 wt % polyvinylpyrrolidone (PVP)
1 wt % SMM41
remainder dimethylacetamide (DMAc)

SMM41 was synthesized with a PPO diol of molecular weight 425, 4.4'-methylene diphenyldiisocyanate (MDI), and the lows boiling fraction of the fluoroalcohol (BA-L). This produced an SMM with a target 3:2:2 stoichiometry of MDI:PPO:BA-L. The conditions of the synthesis for this reaction were as follows. 8.5 grams of PPO were reacted with 7.5 grams of MDI for three hours and then 7.44 grams of BA-L (low boiling fraction) were added to the reaction.

The mixture was reacted without catalyst in 200 mls of dimethylacetamide (DMAc) and the reaction temperature for the prepolymer step was maintained within 45–50° C. The reaction temperature for the end-capping step was 40° C. The polystyrene equivalent weight average molecular weight is $1.9 \times 10^4$ and its total fluorine content is 9% by weight, This SMM had a Tg temperature range of 15° C. to 30° C. This high Tg indicated that it is a relatively rigid SMM.

This membrane was prepared as described above with the exception that instead of being cast on a glass plate, they were cast on a non-woven polyester backing material having a thickness of 0.2 mm (Tyvec 1058)

Pervaporation Results with Isopropyl Alcohol (IPA)

Table 4 and FIG. 1 show the results of pervaporation experiments with an isopropyl alcohol/water mixture with SMM41 based membrane.

Table 4 and FIG. 1 indicate that the water concentration in the feed essentially drops to zero over the time of the experiment thereby indicating that the membrane composition is effective in removing water from a water/iso-propyl alcohol mixture.

EXAMPLE 2

Figure 2:
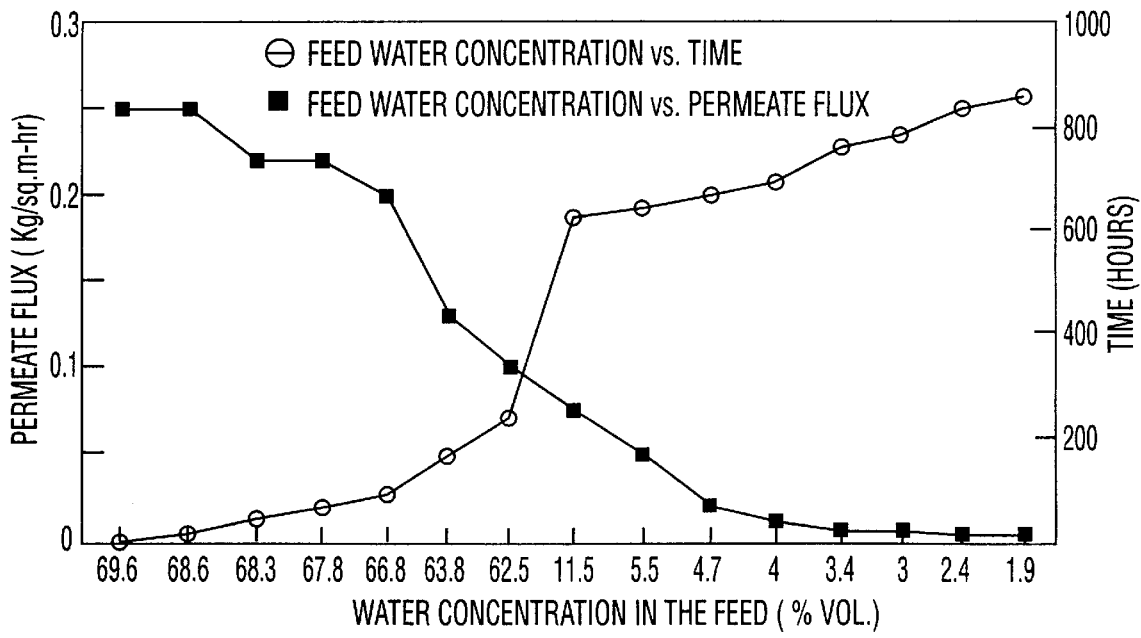
FIG. 2 is a graph showing the results of pervaporation experiments with ethylene glycol.

Table 5 and FIG. 2 show the results of pervaporation experiments for an ethylene glycol/water mixture with an SMM41 based membrane.

TABLE 4

Isopropyl Alcohol pervaporation results

| Sample # | Δt, hours between samples | Water Conc. in feed % Vol. | Permeate mass in gm. | Permeate Flux in kg/m² hr | Water Conc. in permeate % Vol. | Temp. in ° C. | Temp. Out ° C. |
|---|---|---|---|---|---|---|---|
| 1 | 2 | 63.0 | 14.2 | 0.40 | 96.1 | 69 | 68 |
| 2 | 4 | 59.0 | 15.6 | 0.22 | 98.0 | 69 | 68 |
| 3 | 10 | 57.1 | 39.1 | 0.22 | 98.6 | 69 | 68 |
| 4 | 10 | 55.0 | 39.2 | 0.22 | 98.0 | 69 | 68 |
| 5 | 15 | 51.0 | 58.7 | 0.22 | 98.0 | 69 | 68 |
| 6 | 24 | 38.2 | 93.9 | 0.22 | 98.2 | 69 | 68 |
| 7 | 96 | 10.0 | 375.9 | 0.22 | 98.0 | 69 | 68 |
| 8 | 14 | 7.5 | 42.3 | 0.17 | 98.0 | 69 | 68 |
| 9 | 20 | 6.2 | 39.2 | 0.11 | 98.0 | 69 | 68 |
| 10 | 24 | 3.8 | 21.4 | 0.05 | 96.0 | 69 | 68 |
| 11 | 26 | 3.3 | 23.14 | 0.05 | 84.4 | 69 | 68 |
| 12 | 24 | 2.8 | 21.3 | 0.05 | 87.8 | 69 | 68 |
| 13 | 20 | 1.3 | 14.1 | 0.04 | 92.5 | 69 | 68 |
| 14 | 5 | 1.0 | 2.7 | 0.03 | 94.0 | 69 | 68 |
| 15 | 6 | 0.97 | 3.2 | 0.03 | 94.0 | 69 | 68 |
| 16 | 24 | 0.93 | 8.5 | 0.02 | 92.7 | 69 | 68 |
| 17 | 48 | 0.82 | 17.0 | 0.02 | 93.0 | 69 | 68 |
| 18 | 24 | 0.8 | 4.2 | 0.01 |  | 69 | 68 |
| 19 | 48 | 0.50 | 8.5 | 0.01 |  | 69 | 68 |
| 20 | 24 | 0.29 | 4.2 | 0.01 |  | 69 | 68 |
| 21 | 48 | 655 ppm |  | 0.001 |  | 69 | 68 |
| 22 | 24 | 504 ppm |  | 0.001 |  | 69 | 68 |
| 23 | 24 | 349 ppm |  | 0.001 |  | 69 | 68 |
| 24 | 24 | 257 ppm |  | 0.0009 |  | 69 | 68 |
| 25 | 24 | 187 ppm |  | 0.0009 |  | 69 | 68 |
| 26 | 24 | 170 ppm |  | 0.0009 |  | 69 | 68 |

TABLE 5

Ethylene Glycol pervaporation results

| Sample # | Δt, hours between samples | Water Conc. in feed % Vol. | Permeate mass in gm. | Permeate Flux in kg/m² hr | Water Conc. in permeate % Vol. | Temp. in °C. | Temp. Out °C. |
|---|---|---|---|---|---|---|---|
| 1  | 2   | 69.5 | 9.0   | 0.25  | 95.4 | 81 | 80 |
| 2  | 16  | 68.5 | 71.0  | 0.25  | 93.0 | 81 | 80 |
| 3  | 24  | 68.3 | 95.9  | 0.22  | 95.4 | 81 | 80 |
| 4  | 24  | 67.8 | 95.7  | 0.22  | 95.8 | 81 | 80 |
| 5  | 24  | 66.8 | 85.0  | 0.20  | 94.1 | 81 | 80 |
| 6  | 72  | 63.8 | 166.0 | 0.13  | 94.1 | 81 | 80 |
| 7  | 72  | 62.5 | 128.0 | 0.1   | 90.4 | 81 | 80 |
| 8  | 384 | 11.4 | 512.0 | 0.075 | 85.0 | 81 | 80 |
| 9  | 24  | 5.5  | 21.3  | 0.05  | 60.0 | 81 | 80 |
| 10 | 24  | 4.7  | 8.5   | 0.02  | 67.2 | 81 | 80 |
| 11 | 24  | 4.2  |       | 0.01  |      | 81 | 80 |
| 12 | 72  | 3.4  |       | 0.007 |      | 81 | 80 |
| 13 | 24  | 3.0  |       | 0.005 |      | 79 | 78 |
| 14 | 48  | 2.4  |       | 0.005 |      | 79 | 78 |
| 15 | 24  | 1.9  |       | 0.005 |      | 79 | 78 |

Table 5 and FIG. 2 indicate that the water concentration in the feed essentially drops to zero over the time of the experiment thereby indicating that the membrane composition is effective in removing water from a water/ethylene glycol mixture.

Other separation techniques such as ultrafiltration would be expected to be similarly effective in the dehydration of organic/water solutions with membranes as described above.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A membrane composition for the separation of water and volatile organics comprising:
   a. a surface modifying macromolecule (SMM) of the general formula:

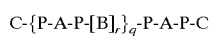
   C-{P-A-P-[B]$_r$}$_q$-P-A-P-C wherein A is a hard segment component of the macromolecule and is a substituted or unsubstituted aromatic and/or aliphatic group, P is a polar linking group, [B]$_r$ is a soft segment polymer, C is a terminal polyfluoro oligomeric group, r is in the range of 1–10, q is in the range of 1–3 and the molecular weight of the [B]$_r$ group is in the range of 200–6000;
   b. a hydrophilic base polymer miscible with the SMM; and,
   c. a hydrophilic pore forming polymer miscible with the base polymer
      wherein the membrane is solution cast from a solution containing
      0.1–5 wt % of the surface modifying macromolecule (SMM)
      10–50 wt % of the hydrophilic base polymer
      0–8 wt % of the hydrophilic pore forming polymer miscible with the base polymer; and,
      37–89.9 wt % of a solvent, said solvent subsequently eliminated from the membrane by either an evaporation or a solvent exchange process or a combination of the evaporation and solvent exchange processes
   and wherein the membrane is permeable to water and impermeable to volatile organics.

2. A membrane as in claim 1 wherein {P-A-P-[B]$_r$}$_q$ is formed by reacting a hard segment precursor, the hard segment precursor a substituted or uusubstituted aromatic and/or aliphatic group having end isocyanate, hydroxy, amine or carboxylic acid groups with a soft segment precursor having end hydroxy or amine groups to form urethane, amide, ester or urea linkages.

3. The membrane as in claim 2 wherein the hard segment precursor is selected from any one of the group methylene di-phenyl 4,4' diisocyanate (MDI), 2,4 toluene diisocyanate, 2,6 toluene diisocyanate, 1,4-cyclohexane dissocyanate, methylene 4,4' di-cylcohexane diisocyanate or 1,6 hexane diisocyanate.

4. The membrane as in claim 2 wherein the soft segment precursor is selected from any one of polypropylene oxide polyol, polytetramethylene oxide, polyalkylene oxide polyol, polycarbonate polyol, polyester polyol or polycaprolactone polyol.

5. A membrane as in claim 1 wherein C is selected from any one of a group having the general formula $CF_3(CF_2)_p CH_2CH_2O$—where p is 4–12 or $CF_3(CF_2)_m(CH_2CH_2O)_n$— where n is 1–10 and m is 1–20.

6. A membrane as in claim 1 wherein P is a urethane, amide, ester or urea linkage.

7. A membrane as in claim 6 wherein the membrane provides a permeation rate of water through the membrane of 0.01–10 kg/m² hr.

8. A membrane as in claim 1 wherein the base polymer is selected from any one of or a combination of polyvinylpyrrolidone, polyureas, polyetherimides, polyesters, polyurethane, cellulose acetate or polycarbonates.

9. A membrane as in claim 1 wherein the pore forming polymer is selected from any one of or a combination of polyvinylpyrrolidone (PVP), ethylene glycol, alcohols, polyethylene glycol.

10. A membrane as in claim 1 wherein the membrane enables the permeation of water through the membrane by pervaporation and prevents the permeation of volatile organics through the membrane.

11. A membrane as in claim 1 wherein the solution cast membrane is a hollow fibre.

12. A membrane as in claim 1 wherein the membrane has an advancing contact angle greater than 90 degrees and a receding contact angle greater that 21 degrees.

13. A membrane as in claim 1 wherein the fluorine/carbon ratio at the membrane surface to a depth of 10 nm is greater than or equal to 0.2.

14. A membrane as in claim 1 wherein the membrane further comprises a backing material.

15. A membrane for the separation of water and volatile organics comprising:

a. a surface modifying macromolecule (SMM) of the general formula:

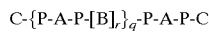

C-{P-A-P-[B]$_r$}$_q$-P-A-P-C wherein A is a hard segment component of the macromolecule and is a substituted or unsubstituted aromatic and/or aliphatic group, P is a polar linking group, [B]$_r$ is a soft segment polymer, C is a terminal polyfluoro oligomeric group selected from any one of a group having the general formula $CF_3(CF_2)_p CH_2CH_2O$—where p is 4–12 or $CF_3(CF_2)_m (CH_2CH_2O)_n$—wherein n is 1–10 and m is 1–20, r is in the range of 1–10, q is in the range of 1–3 and the molecular weigh of the [B]$_r$ group is in the range of 200–6000 wherein {P-A-P-[B]$_r$}$_q$ is formed by reacting a hard segment precursor selected from any one of the group methylene di-phenyl 4,4' diisocyanate (MDI), 2,4 toluene diisocyanate, 2,6 toluene diisocyanate, 1,4-cyclohexane diisocyanate, methylene 4,4' di-cylcohexane diisocyanate or 1,6 hexane diisocyanate with a soft segment precursor, the soft segment precursor selected from any one of polypropylene oxide polyol, polytetramethylene oxide, polyalkylene oxide polyol, polycarbonate polyol, polyester polyol or polycaprolactone polyol;

b. a hydrophilic base polymer miscible with the SMM; and, c. a hydrophilic pore forming polymer miscible with the base polymer wherein the membrane is solution cast from a solution containing 0.1–5 wt % of the surface modifying macromolecule (SMM)

10–50 wt % of the hydrophilic base polymer selected from any one of or a combination of polyethersulfones, polyureas, polyetherimides, polyesters, polyurethane, cellulose acetate or polycarbonates;

0–8 wt % of the hydrophilic pore forming polymer selected from any one of or a combination of polyvinylpyrrolidone (PVP), ethylene glycol, alcohols, polyethylene glycol, the hydrophilic pore forming polymer miscible with the base polymer; and, 37–89.9 wt % of a solvent, said solvent subsequently eliminated from the membrane by either an evaporation or a solvent exchange process or a combination of the evaporation and solvent exchange processes wherein the membrane is permeable to water and impermeable to volatile organics.

16. A method of separating water from a solution containing water and at least one volatile organic compound with a membrane by feeding the water/volatile organic solution into a pervaporation cell having a membrane as defined in claim 1 and collecting a downstream water permeate.

17. A method as in claim 16 wherein the water/volatile organic solution contains any one of or a mixture of methanol, ethanol, butanol, isopropyl alcohol, ethylene glycol, butyl cellosolves, iso propyl cellosolves, glycol, glutaric acid, succinic acid, adipic acid, nitric acid, acetone, methyl ethyl ketone (MEK), methylisobutyl ketone (MIBK), ethyl acetate, n-butyl acetate, xylene, toluene, aliphatic hydrocarbons, methylene chloride, fatty acids or salts.

* * * * *